Figure 1:
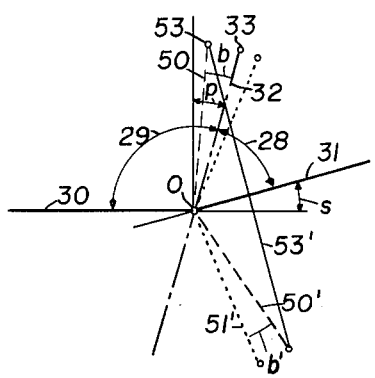

Feb. 22, 1966  E. WILDHABER  3,236,186
POSITIVE-DISPLACEMENT UNIT
Filed April 29, 1963  3 Sheets-Sheet 1

INVENTOR:
Ernest Wildhaber

Feb. 22, 1966    E. WILDHABER    3,236,186
POSITIVE-DISPLACEMENT UNIT
Filed April 29, 1963    3 Sheets-Sheet 2
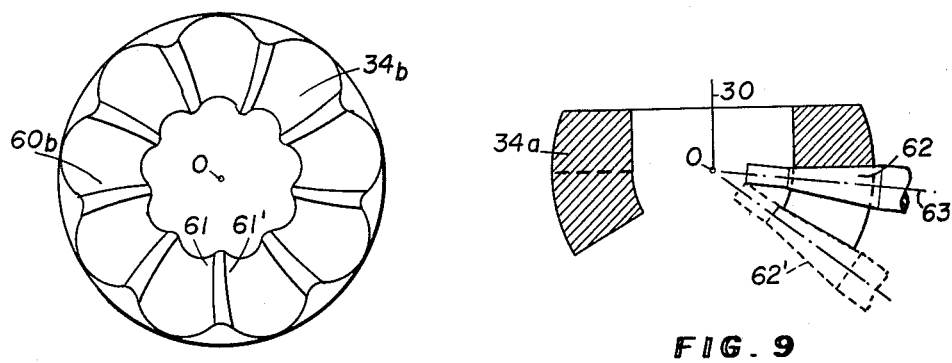
FIG. 7    FIG. 9
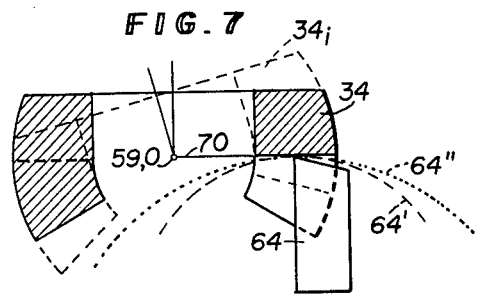    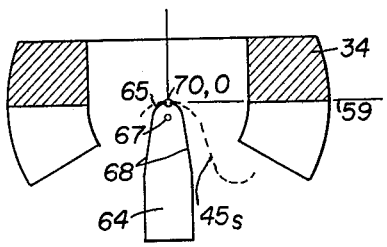
FIG. 10    FIG. 11
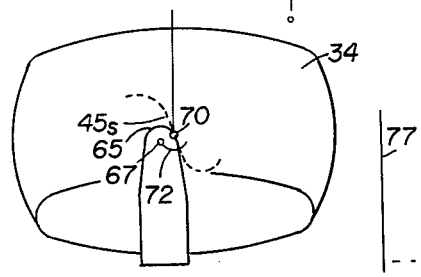    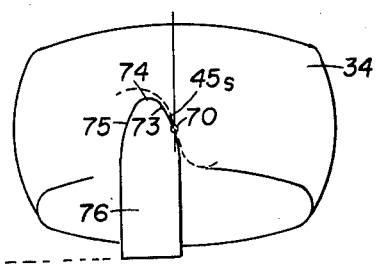
FIG. 12    FIG. 13
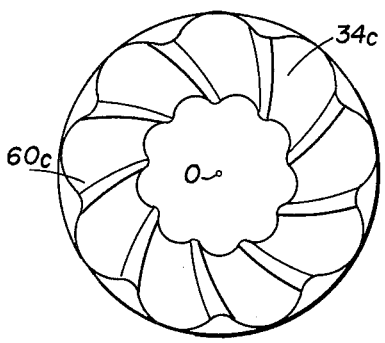
FIG. 8
INVENTOR:
Ernest Wildhaber

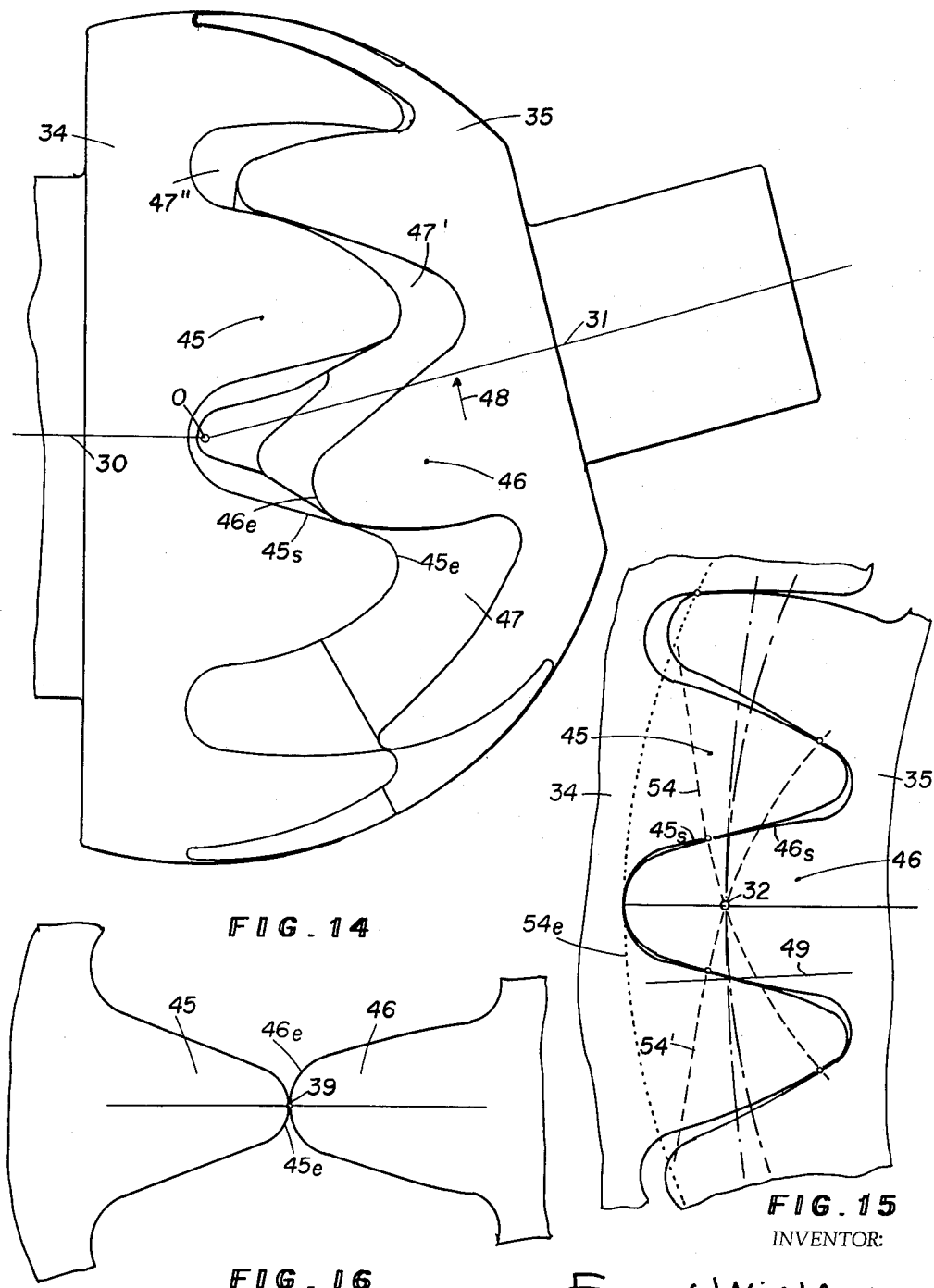

United States Patent Office 3,236,186
Patented Feb. 22, 1966

3,236,186
POSITIVE-DISPLACEMENT UNIT
Ernest Wildhaber, 124 Summit Drive, Brighton, N.Y.
Filed Apr. 29, 1963, Ser. No. 276,285
15 Claims. (Cl. 103—127)

The present invention relates to rotary positive-displacement units. The unit may be embodied as a compressor, a pump, a motor or engine, and as a unit combining a compressor and a motor. A unit referred to comprises at least a housing, a pair of rotors with interengaging lobes or teeth designed for mesh all around their periphery, and ducts for leading fluid to and from the rotors. The pair of interengaging rotors have numbers of lobes or teeth that differ by one.

Pumps of this general description are known with rotors that run on parallel axes, and where one rotor has teeth provided on its outside periphery while the other rotor surrounds said one rotor and has teeth provided internally thereon. Such known structure is limited in tooth depth, which is bound to be the circular pitch divided by $\pi=3.1416$. This limits the displacement, and there are other limitations.

One object of the present invention is to devise a unit of the character referred to which is not thus limited, and where the lobe depth is larger than one third of the circular pitch, usually much larger. A further object is to devise a unit whose rotors can run at very high speed and which can stand far more centrifugal inertia loads than the internally toothed member of known design. A further aim is to devise a unit with a pair of rotors which expand more nearly in a direction lengthwise of the lobes when run at high temperature, so as to remain well matched.

In the known rotors with parallel axes, contact is mainly with the sharply curved end surfaces of the teeth. These contact side surfaces or each other. A further and important aim is to devise a unit wherein the side surfaces themselves of the mating lobes are adapted to contact each other, and to contact so as to have a duration of contact between side surfaces larger than one pitch. These mating side surfaces are only moderately curved away from one another and can carry considerable load. A still further aim is to devise a unit for gases or air that can be run at very high speed without requiring timing gears, and where the lubrication provided on the side surfaces of the lobes by the gaseous fluid is sufficient to carry the loads sustained.

A still further object is to provide a unit embracing a compressor and a motor or engine of different volume displacement, where one of the pair of rotors of the compressor is rigid with one of the pair of rotors of the motor.

Other objects will appear in the course of the specification and in the recital of the appended claims. These objects may be attained singly or in any combination. They are attained with rotors whose axes intersect at an angle.

Figure 2:
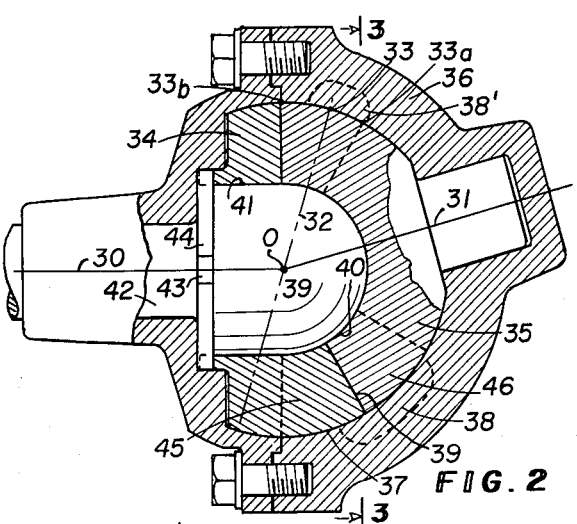
Figure 4:
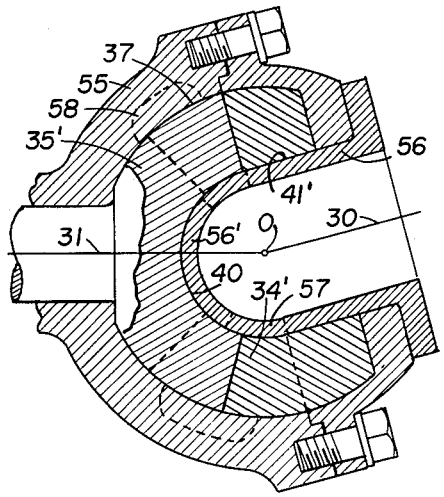
Figure 3:
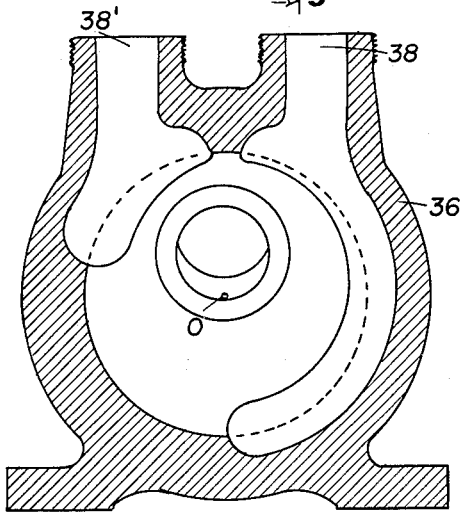
Figure 6:
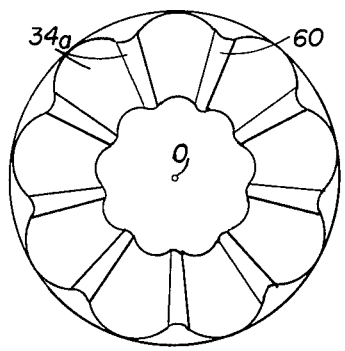
Figure 5:
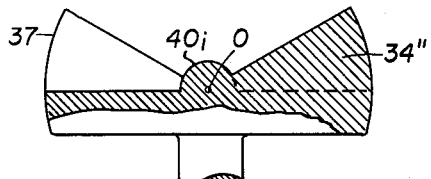

In the drawings:
FIG. 1 is a diagram explanatory of the principles underlying the present invention.
FIG. 2 is an axial section of a unit constructed according to the present invention.
FIG. 3 is a section through the casing of this unit, taken along lines 3—3 of FIG. 2.
FIG. 4 is an axial section of a modified unit.
FIG. 5 is an axial section, partly a side view, of a rotor of modified design.
FIG. 6 is an axial view of a rotor constructed according to the present invention, looking at its face, showing its straight lobes or teeth directed towards its apex.
FIG. 7 is a similar axial view, showing lobes curved lengthwise.
FIG. 8 is an axial view of a modified rotor showing lobes curved lengthwise and spirally inclined.
FIG. 9 is a diagram illustrating one way of producing rotor lobes or teeth constructed according to the invention. It shows the rotor in axial section.
FIG. 10 is a similar diagram employing reciprocating tool motion.
FIG. 11 is an axial section of a rotor and a diagrammatic view of tool means corresponding to FIG. 10, looking in the direction of the tool motion. The tool is shown in a position cutting or grinding the lobe bottom.
FIG. 12 is a view looking in the direction of the tool motion when the tool engages the side of a lobe. FIG. 12 corresponds to FIGS. 10 and 11 and shows the rotor in a diagrammatic view in a tilted position.
FIG. 13 is a diagrammatic view like FIG. 12, but illustrating a different tool profile.
FIG. 14 is an enlarged view of the rotors shown in FIG. 2, looking at right angles at the plane of their axes.
FIG. 15 is a fragmentary view thereof taken in the direction of the instantaneous axis (32 in FIG. 2) and showing the fully engaged lobes.
FIG. 16 is a fragmentary view looking along the line of contact of the lobe ends, taken along line 39 of FIG. 2.

In the digram FIG. 1 numerals 30, 31 denote the rotor axes intersecting at apex 0. The rotor with axis 31 has any number N of lobes or teeth, while the rotor with axis 30 has $(N+1)$ lobes or teeth. As the rotors run at the ratio of their tooth numbers, there is a fixed axis 32 of instantaneous relative motion. It can be considered the line of contact of conical pitch surfaces which move with the rotors and roll on each other without sliding. Any point 33 of the instantaneous axis 32 has distances from the axes 31, 30 in proportion to the tooth numbers N $(N+1)$.

Let $s$ denote the shaft angularity and $p$ the inclination of instantaneous axis 32 to the vertical. The pitch angles 28, 29 of the two rotors are then $(90°-s-p)$ and $(90°+p)$. The distances of point 33 from the axes 31, 30 can then be expressed as $(0-33)\cdot\cos(s+p)$ and $(0-33)\cdot\cos p$ respectively.

Their proportion $$\frac{\cos(s+p)}{\cos p} \text{ equals } \frac{N}{(N+1)}=m$$

As known this can be transformed into $$\tan p = \frac{\cos s - m}{\sin s}$$

where $$m = \frac{N}{(N+1)}$$

It will now be shown numerically how much more lobe depth is attainable with intersecting axes than with parallel axes.

For instance at a ratio of the lobe numbers of $$(N+1)/N = 9/8$$

angle $p$ figures 16° 35′ at $s=15°$. The tooth depth $2s$ is then 30°, measured on a great circle. The angular pitch, also measured on a great circle is $$\frac{360°}{9}\cdot\cos p = 38° 20′$$

The proportion of the lobe depth to pitch is $$30/38.33 = 1/1.28$$

With parallel axes of the rotors the pitch circle circumferences differ by the circular pitch, and the pitch circle diameters differ by the circular pitch divided by $\pi$. The tooth depth equals the difference in pitch circle diameters. The proportion of tooth depth to circular pitch is thus unavoidably $1/\pi = 1/3.1416$. It is less than one third.

The depth proportion has a profound influence on the lobe shape attainable, and of course the larger proportion increases the displacement.

The rotors 34, 35 (FIG. 2) with axes 30, 31 are rotatably mounted in a housing 36 formed by two parts tightly bolted together. The rotors have convex outer surfaces lying in a common spherical surface 37 that is centered at apex 0 at which the axes 30, 31 intersect. This surface matches a counterpart concave spherical surface provided in housing 36. The counterpart surface serves as a seal and is interrpted by ducts 38, 38'. When FIGS. 2 and 3 refer to a compressor, the outlet pressure is higher than the inlet pressure and the outlet area is more confined. 38 is the inlet, 38' the outlet for a compressor. On a motor or engine the inlet pressure is higher, and the inlet area is more confined. Looking at FIG. 3, rotation is in clockwise direction for a compressor, in counterclockwise direction for a motor.

At their inner ends the lobes 45, 46 bear against or match a spherical surface portion 40 also centered at 0. This portion is formed integral with a cylindrical portion 41 and shaft 42. Rotor 34 is made rigid with shaft 42 by lateral propections that engage slots 43 provided on a flange 44 of shaft 42.

FIGS. 14 to 16 afford enlarged views of the rotors 34, 35. Their interengaging lobes 45, 46 form pockets 47, 47', 47", ... of changing volume. When rotation is in direction of arrow 48 the pockets diminish in volume. On a compressor the outlet area starts in a region where the volume has been substantially decreased.

Profiles

I may start a design by assuming the lobe numbers N $(N+1)$ and the shaft angularity $s$. This determines the angular lobe depth, which is $2s$. Next I may determine the axes of curvature of the convex outer lobe ends, and particularly their angular distance from each other when they contact at their outer ends (FIG. 16). The lobe surfaces now considered are composed of straight-line elements that all pass through apex 0. The end surface portion lies either in a circular conical surface or in a surface whose curvature at the end coincides with that of a conical surface. In one embodiment the end-surface portion 46e (FIG. 14) of rotor 35 having N lobes is part of a circular conical surface. FIG. 1 shows the axis 50 of this conical surface in the position where it lies in the plane of the axes 30, 31. It includes an angle $b$ with the instantaneous axis 32. 50' shows the position of axis 50 after rotation about rotor axis 31 through half a turn, so that it again lies in the plane of the axes 30, 31, the drawing plane of FIG. 1. The curvature axis 51' of the lobe end 45e of rotor 34 includes an angle or arc $b'$ with curvature axis 50'. This arc is preferably smaller than half the circular pitch, measured as an arc on a great circle whose plane passes through 0.

The following formula can be derived for the angle $b'$ with the method of spherical trigonometry:

$$\tan b' = \frac{P \sin^2 c}{1 + P \sin c \cdot \cos c}$$

wherein $$P = \tan(s+p) - \tan p$$

and $$c = 2(s+p) - b$$

Angle $b$ is changed until $b'$ attains a desirable amount.

After assuming the lobe end 46e of rotor 35 and its axis of curvature 50 the entire surface of the lobes 45 can be determined as the surface enveloped by this lobe end when it is turned about axis 31 while rotor 34 turns on its axis at the ratio of the tooth numbers or lobe numbers $(N+1)$ and N, so that the conical pitch surfaces roll on each other without sliding.

When the assumed tooth end 46e is a circular conical surface, it can be embodied by a conical milling cutter or grinding wheel whose axis coincides with axis 50. When the axis of this tool is moved relatively to a rotor 34 as stated above, the rotating tool will produce the lobes thereof.

During such motion axis 50 (FIG. 1) describes a conical surface, and its point 53 traces a circle 53' showing up as a straight line. Contact between rotor 34 and the conical end surface is always in a plane that connects the instantaneous axis 32 with the considered position of axis 50. It is along the cone element that lies in said plane, the normal plane of said element. Broadly contact is in a turning position where the normal plane of a considered straight-line element passes through and contains the instantaneous axis. The said plane is then a contact plane, common to both rotors.

The desired tooth thickness is attained by changing an initially assumed cone angle of the end surface.

It should be noted that the side surfaces 45s have a desirable moderate inclination to axial planes, that is to planes containing axis 30. This is a result of the increased lobe depth. The side profiles, the profiles of the side surfaces 45s, are inclined less than thirty degrees to the axial plane (49, FIG. 15) passing through their mid-portion.

The side surfaces 45s contact the end surfaces 46e of rotor 35, and they have a further position of contact. The said contact plane passes through the instantaneous axis 32 a second time in its rotation about axis 30. In the second position contact is between the lobe sides 45s, 46s of the rotors 34. 35. This is also apparent from consideration of FIG. 15. Obviously the sides 45s have mating lobe sides 46s. The contact position for the sides can be computed with the known procedures of spherical trigonometry. Knowing the contact position and the line of contact the mating shape itself can be readily determined.

54 (FIG. 15) is the path of contact between the lobe sides 45s, 46s. 54' is the path of contact for the opposite lobe sides. It is seen that the duration of contact obtained with path 54 is larger than one full pitch, as the lobes are relatively deep. Always at least one pair of lobes contact with their side profiles, on each of the two opposite lobe sides. Because of the moderate relative curvature of the side profiles a considerable load can be carried at all times, even under adverse conditions of lubrication, or with lubrication by gaseous fluid only.

Dotted line 54e is the path of contact of the lobe ends 46e.

33-33a, FIG. 2, is the lobe addendum of rotor 34; and 33-33b is the lobe dedendum thereof. While the addendum is smaller than the dedendum in the example illustrated, it may also be made larger than the dedendum in many cases.

In the embodiment of FIGS. 2 and 3 the outlet opening and the inlet opening are both provided adjacent the outer end of the rotor lobes, at the spherical surface 37.

Modified embodiments

FIG. 4 illustrates an embodiment with inlet opening at the inner spherical surface 40 and outlet opening at the outer spherical surface 37. This embodiment may be used on pumps, where the centrifugal action adds to the effect. It may also be used further if desired. The rotors 34', 35' with axes 30, 31 have the described shape. They are rotatably mounted in a housing 55 to which is rigidly secured a tubular member 56 with rounded end 56'. This end contains the described inner spherical surface portion 40 on its outside and an adjacent cylindrical surface portion 41' which serves as a journal for rotor 34'. Fluid enters along axis 30 and through openings 57 provided in end 56'. Outlet duct 58 leads to an outlet not shown.

In the embodiments so far illustrated the inner spherical surface 40 has about half the diameter of the outer spherical surface 37. If the lobes or teeth were continued all the wax to apex 0, the volume displaced inside of surface 40 would be only one-eighth of the volume displaced inside of surface 37 of double diameter. With lobes having their inner ends at surface 40 the displacement is still ⅞ of the maximum displacement possible inside of surface 37, while a material advantage is gained in the production by cutting or grinding. However when production is for instance by moulding, coining or casting the production advantage is reduced and I may diminish the inner spherical end surface to almost nothing. FIG. 5 shows a rotor 34'' so shaped. The inner spherical surface 40i has less than half the radius of the outer spherical surface 37, and the knob containing surface 40i is formed integral with rotor 34''.

Proportionately small inner spherical surfaces may also be provided on rotors of large size, and on rotors intended for extreme rotational speeds where the increased production cost is acceptable.

FIG. 6 is an axial end view of a rotor 34a that may be used as rotor 34 in the described units. It has straight lobes or teeth 60 directed towards apex 0, at which the axes of the rotor pair intersect. The surface of its lobes is made up of straight-line elements, all passing through apex 0.

FIG. 7 is an axial view of a rotor 34b whose lobes 60b are curved lengthwise, chiefly for a production advantage in medium and small sizes. Opposite lobe sides 61, 61' are convex and concave lengthwise, respectively. At their mid-portion the lobes are directed towards apex 0.

The rotor 34c shown in FIG. 8 has longitudinally curved lobes 60c that are spirally arranged. Spirally arranged lobes may be considered especially in the embodiment described with FIG. 4. The types illustrated in FIGS. 6 to 8 can each be used in both described embodiments.

If desired, I may use blades or vanes in the inlet and outlet passages, to direct the fluid more positively.

*Production*

One way of producing a rotor 34 with straight radial lobes in a generating operation has already been described. The mating rotor 35 may be cut with the same conical milling cutter in a similar rolling motion. Here however the turning motion about the two intersecting axes is at a varying ratio. A timing change is introduced for instance by cam means.

Another method, also suited for large sizes, will now be described with FIG. 9. It uses the same conical milling cutter 62 or grinding wheel whose axis 63 intersects the axis 30 of the rotor blank 34a at apex 0. The cutter 62 is rotated on its axis for stock removal, while the workpiece 34a is slowly turned on its axis 30 and while the cutter is fed about apex 0. It is fed about an axis intersecting the workpiece axis at apex 0 and that may be perpendicular to axis 30 and to the drawing plane. Another position of cutter 62 during its feed motion is shown in dotted lines 62'. The feed motion of the cutter is at a varying ratio to the turning motion of the workpiece. It is a slow oscillating motion between two end positions timed to the turning motion of the workpiece. While the turning motion of the workpiece can be at a uniform rate, a better production rate is attained by cyclically varying the speed of the feed motions.

The mating rotor 35 may be produced with the same cutter and the same method, using a different timing between the turning motion of the workpiece and the angular feed motion between the cutter and workpiece.

FIGS. 10 to 12 illustrate a method using tool reciprocation. Edged tool 64 or grinding wheel 64' has a convexly curved working profile 65 or cutting edge, that is at least as much curved as the concave bottom profile of the rotor at the inner lobe end. It is a circular arc centered at 67 (FIG. 11). The sides 68 merely serve to support the working profile without contributing to the shape produced. Tool 64 or wheel 64' is reciprocated lengthwise of the lobes towards and away from apex 0 along line 70. Line 70 lies in the plane of FIG. 10 and is perpendicular to the drawing plane of FIGS. 11 and 12. FIGS. 10 and 11 show the position where the tool cuts the lobe bottom along line 70. To produce the side surfaces of the lobes, the workpiece 34 is fed angularly about an axis 59 passing through apex 0 and perpendicular to the drawing plane of FIG. 10. Dotted lines 34i show the workpiece in a tilted position where a straight-line element of the lobe side is produced. This cutting position is also shown in FIG. 12.

To cut or grind along a fixed line 70 all the time, the cutting tool or grinding wheel is fed in a circular path 72 about an axis coinciding with line 70, at such a rate that the profile inclination of the tool at line 70 coincides continuously with the profile inclination of the workpiece. This additional feed motion of the tool may be a circular translation, where the tool remains parallel to itself, and where center 67 describes arc 72. The said additional motion is timed with the turning motion of the workpiece. The angular feed motion between the workpiece and tool is also timed with said turning motion, again at a varying rate.

Production advantages are gained by periodically varying the speed of the feed motions. The process is continuous. The workpiece is fed in and out about axis 59 once for each lobe. The lobes are completed after the workpiece has made a full turn.

Grinding wheel 64' should be small enough to clear the workpiece 34 on the far side. The size restriction is less severe when the larger rotor 34 of the pair has an uneven number of lobes. Then a lobe space is diametrically opposite a lobe. And the grinding wheel can reach somewhat into a lobe space when grinding the outside end of a lobe.

Roughing may be accomplished with a rotary cutter 64'' (FIG. 10) of the same profile shape, without reciprocation but with the same feed motions.

Spiral teeth may be produced by adding a continuous turning motion of the workpiece and timing the reciprocations with said added motion.

FIG. 13 illustrates a working profile 73 of varying curvature. It is convex and most curved at its end 74 and less curved on both sides 75. It can be used on a reciprocating tool or grinding wheel or also on a tool 76 that oscillates about an axis 77 for cutting. In the latter case the mating rotor 35 with convex face surface may be cut with a rotating cutter that turns about axis 77.

Axis 77 lies in a plane perpendicular to line 70. The said additional tool motion is in this plane and is such that the tool profile 73 always passes through the fixed point at which line 70 intersects said plane. This additional tool motion is so timed with the turning motion of the workpiece that the tool profile has the same inclination as the lobe profile passing through said fixed point, so that the two profiles contact at said point. Except for the additional tool motion, the feed motions are the same as in the method described with FIGS. 10 to 12. They are such that fixed line 70 describes the lobe surfaces.

While the additional tool motion for working profiles (73) of varying curvature is more complex than for circular arcuate working profiles, there is less tool wear, improved finish of the lobe sides and improved production efficiency.

The described lobe shape is furthermore singularly well adapted to finishing by shaving, burnishing and lapping because of the many simultaneous contacts all around the circumference.

While the invention has been described in connection with different embodiments thereof, it is capable of further modification and this application is intended to cover any variations, uses, or adaptations of the invention, following, in general, the principles of the invention and including such departures from the psesent disclosure as come within known or customary practice in the art to which the invention pertains and as may be applied to the essential features hereinbefore set forth and as fall within the scope of the invention or the limits of the appended claims.

I claim:

1. A positive-displacement unit comprising a housing, a pair of rotors disposed inside of said housing, said rotors being rotatably mounted on axes lying in a plane and having lobes whose numbers differ by one and that engage each other around their entire peripheries, the depth of said lobes in an axial plane of the respective rotor being larger than one third their circular pitch, and ducts leading to and from the interengaging lobes.

2. A positive-displacement unit comprising a housing, a pair of rotors disposed inside of said housing, said rotors being rotatably mounted on intersecting axes and having lobes whose numbers differ by one and that engage each other around their entire peripheries, the thickness of the lobes of each rotor increasing with increasing distance from the axis of rotation of the respective rotor, the depth of the lobes of each rotor in a plane containing the axis of the rotor being larger than one third their circular pitch, and ducts leading to and from said interengaging lobes.

3. A positive displacement unit according to claim 2, wherein the lobes of both rotors have side profiles which extend from top to bottom of the lobes and which are inclined to axial planes of the respective rotors by less than thirty degrees at their mid-portion.

4. A positive displacement unit according to claim 2, wherein the lobes of both rotors have rounded tops adapted to engage each other, the arc between the curvature axes of mating tops being smaller than one half the circular pitch of the lobes measured as an arc on a great circle.

5. A positive-displacement unit according to claim 2, wherein the lobes contain side portions inclined to axial planes of the respective rotors by less than thirty degrees and more curved top portions and bottom portions, said lobes being deep enough so that their mating side portions provide a duration of contact in excess of one pitch.

6. A positive-displacement unit according to claim 2, wherein the lobes of the rotor pair are straight and directed towards the intersection of the rotor axes.

7. A positive-displacement unit according to claim 2, wherein the lobes of the rotor pair are curved lengthwise.

8. A positive-displacement unit according to claim 2, wherein one rotor of the pair has a pitch angle larger than a right angle, and wherein the other rotor has lobe profiles with convex circular arcuate tops.

9. A positive fluid-displacement unit having a pair of rotors mounted in a housing on intersecting axes and having spherical outer surfaces, said rotors having lobes engaging each other around their entire periphery and having numbers differing by one, the lobes of each rotor terminating at their respective outer surfaces and having a thickness decreasing with increasing distance from their respective outer surfaces, inlet and outlet openings and ducts provided adjacent the ends of said lobes, said outlet opening and duct being disposed adjacent sai outer surfaces.

10. A positive-displacement unit according to claim 9, wherein the inlet opening as well as the outlet opening are provided adjacent said spherical outer surfaces.

11. A positive-displacement unit according to claim 9, wherein the lobes of the respective rotors terminate at the outer spherical surface of the respective rotors and at an inner spherical surface, and wherein the inlet opening is provided adjacent said inner spherical surfaces, and the outlet opening is provided adjacent said outer spherical surface.

12. A pair of rotors having intersecting axes, said rotors having lobes whose numbers differ by one and that extend inwardly from a spherical outer surface centered at the intersection of said axes, said lobes being shaped to engage each other around their entire peripheries, the depth of the lobes of each rotor in a plane containing the axis of the respective rotor being larger than one third of their circular pitch.

13. A pair of rotors according to claim 12, wherein the lobes are straight and directed towards the intersection point of the rotor axes.

14. A rotor having a plurality of lobes spaced about an axis and projecting from a body portion which has a spherical outer surface, said lobes being directed towards a common point on said axis from said spherical outer surface, whereby profiles are formed in said spherical outer surface, each lobe having two opposite side profiles connected by an end profile distal from said body portion and connected each with an adjacent side profile by a bottom profile at said body portion, the depth of said lobes in said spherical surface being larger than one half the circular pitch of the lobes at mid-depth, said end profile being a continuous single convex curve, and said bottom profile being a continuous single concave curve.

15. A rotor according to claim 14, wherein the lobe ends are tangent to a convex conical surface.

References Cited by the Examiner

UNITED STATES PATENTS

| | | | |
|---|---|---|---|
| 32,372 | 5/1861 | Jones et al. | 103—127 |
| 351,129 | 10/1886 | Salomo | 103—127 |
| 758,214 | 4/1904 | Nielsen | 91—85 |
| 1,379,653 | 5/1921 | Shoemaker | 91—85 |
| 1,626,768 | 5/1927 | Vollman | 230—158 |
| 1,858,568 | 5/1932 | Wildhaber | 51—287 |
| 1,912,634 | 6/1933 | Gray | 123—12 |
| 2,582,413 | 1/1952 | Clark | 103—127 |
| 2,831,436 | 4/1958 | Schmidt et al. | 103—127 |
| 3,101,700 | 8/1963 | Bowdish | 230—142 |
| 3,106,912 | 10/1963 | Kahlert | 103—127 |

DONLEY J. STOCKING, *Primary Examiner.*

WILBUR J. GOODLIN, KARL J. ALBRECHT,
*Examiners.*